Nov. 8, 1938.  J. H. PALMER  2,135,675
APPARATUS FOR DETERMINING AND RECORDING THE ECCENTRICITY
OF LEAD SHEATHS OR OTHER CONDUCTING PIPE
Filed April 16, 1936  3 Sheets-Sheet 1

INVENTOR
John Hunter Palmer
ATTORNEY

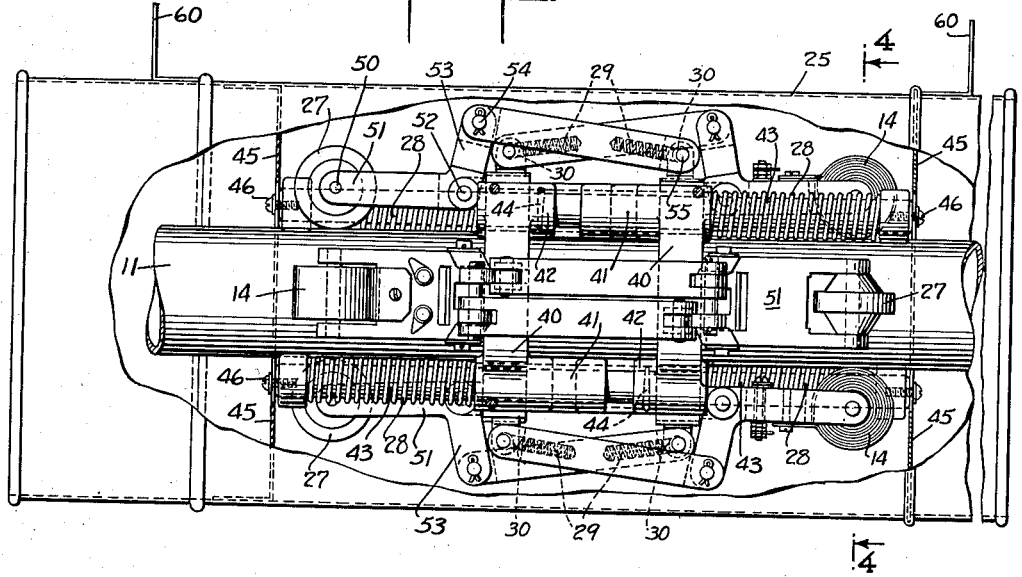
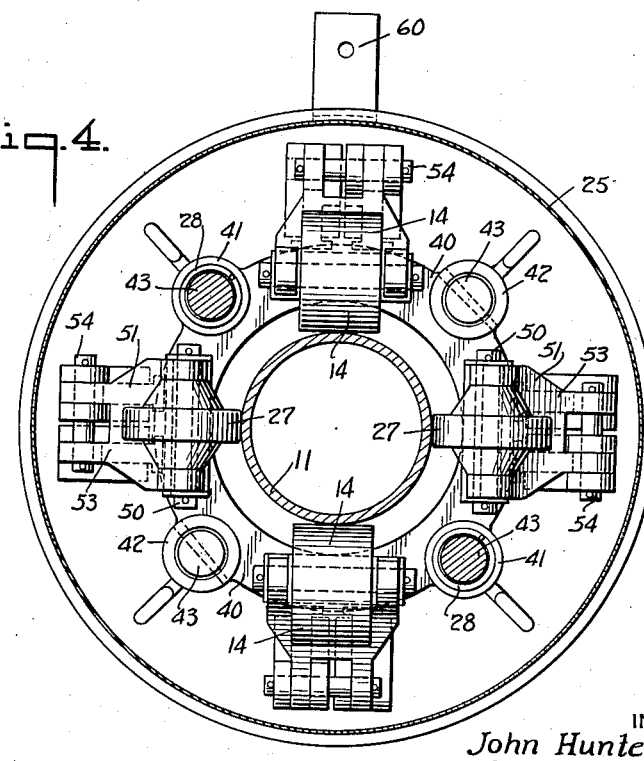

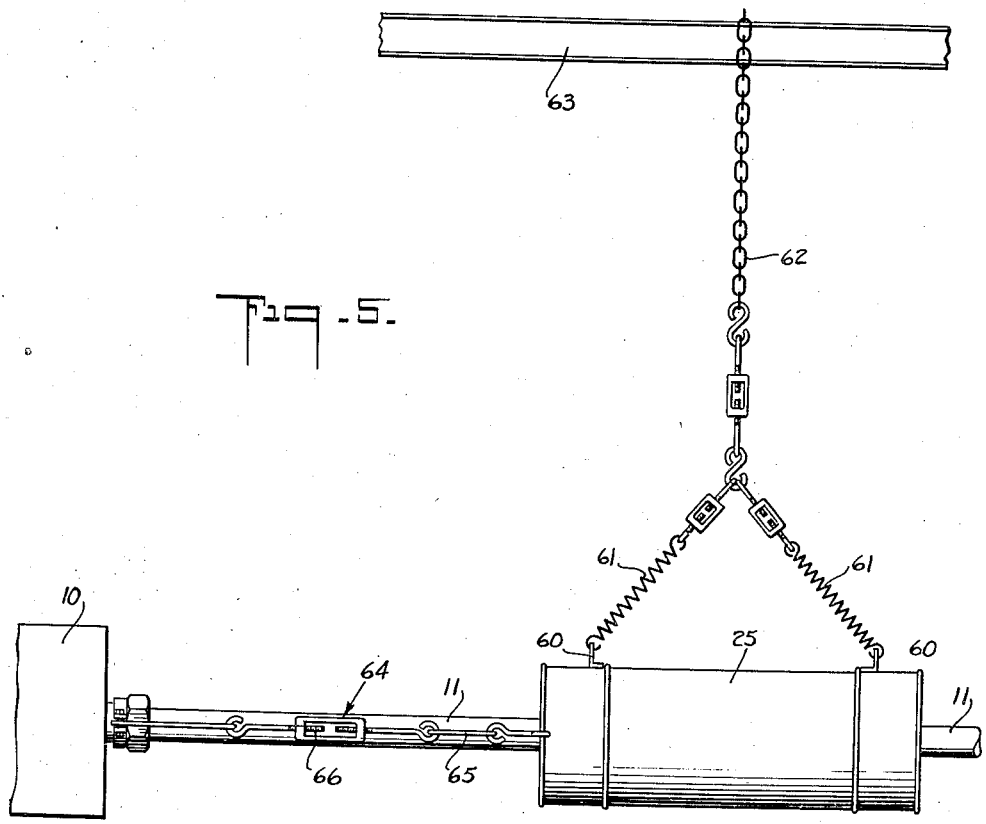

Patented Nov. 8, 1938

2,135,675

UNITED STATES PATENT OFFICE 2,135,675

APPARATUS FOR DETERMINING AND RECORDING THE ECCENTRICITY OF LEAD SHEATHS OR OTHER CONDUCTING PIPE

John Hunter Palmer, Greenville, N. Y., assignor to Phelps Dodge Copper Products Corporation, New York, N. Y., a corporation of Delaware Application April 16, 1936, Serial No. 74,710

4 Claims. (Cl. 175—183)

My invention relates to eccentricity detecting and/or recording devices and more specifically to an apparatus for determining, and where desirable, recording the eccentricity of the lead sheath and/or pipe as it is extruded on an electrical cable. Such sheath or pipe is extruded from a press and it is important that the thickness of the wall be uniform along the entire circumference. Variations of temperature in the extrusion block or other causes have the effect of making the lead thicker on one side than on the other and this condition is difficult to guard against. The present invention provides a method of detecting and measuring the eccentricity of the lead sheath or pipe continuously as it is extruded from the press.

In the practicing of my method an electric current is passed longitudinally through the lead pipe from a point at or near the die block to a point on the pipe somewhat removed therefrom. This current creates a magnetic field around the lead pipe, which field is concentric with the pipe, providing the current is disposed symmetrically around the pipe. If, however, by reason of eccentricity of the pipe, the current is disposed unevenly, the magnetic field around the pipe will show corresponding divergencies. By using alternating current, the field strength may be measured by noting the voltages induced in pick-up coils in any part of the field. If a pair of such coils is set on a diameter of the pipe, one on each side and equidistant from the pipe, any differences in the magnetic field on the two sides of the pipe may be detected and measured by the differences in the currents or voltages induced into the two coils.

By having two pairs of such pick-up coils set on diameters at right angles to one another, detection and measurement of eccentricities in either direction may be made.

I am aware that this general principle has been utilized by other inventors. Their inventions, however, do not give the results which I have been seeking. The present specification describes those changes which I have found it necessary or advisable to make, in order to render such a system operative.

It will be understood that my apparatus comprises four parts: 1. Means for circulating current through the pipe; 2. Pick-up coils and their supports; 3. Electrical circuits for combining the currents from the pick-up coils; 4. Detecting or recording instruments.

I have found it advantageous to use alternating current of about 100 cycles frequency, the density of the current being about 50 amperes per square inch of pipe. The current is introduced into the pipe by a permanent connection to the die block of the press and by a sliding contact with the pipe at a distance of about twelve feet from the press.

I have found it necessary to enclose pick-up coils in a magnetic and electrostatic shield, in order to prevent interference from outside electrical disturbances. This shield consists of iron pipe which encloses the pick-up coils and constitutes the framework of this part of the system whereby it is supported. I have found the most advantageous arrangement consists of two pairs of pick-up coils, one set on a horizontal, and one on a vertical axis. In order to keep the pick-up coils centered, a pair of rollers is used in connection with each pair of coils, which holds the cable and pick-up coils in their proper relative positions. The pick-up coils and rollers are linked together so that they all make simultaneous contact with the pipe as it is being extruded regardless of its diameter. This whole system is supported in such a way as to follow the pipe in the course of any swaying to which it may be subjected.

The third part of my apparatus consists of two circuits, one for each pair of pick-up coils, each circuit comprising, in addition to the one pair of pick-up coils already described as a transformer, a variable inductor, a variable resistor, an amplifier and a rectifier. The circuit is completed by the instruments to be described under part 4. The variable inductor and resistor are for the purpose of balancing the phase and magnitude of the opposing induced currents. This feature I have found to be essential to the proper operation of the apparatus. A capacitor might be used in connection with balancing of phases but I have not found this to be necessary.

The fourth part of my apparatus consists of a pair of graphic recording instruments, each with its chart drive geared to operate synchronously with the flow of the pipe so that the chart travel is directly proportional to the length of extruded pipe. The rectifier described under part 3 enables me to use D. C. milliammeters of high sensitivity. By this means I am able to make records of the horizontal and vertical eccentricity of pipe.

The foregoing and other features of my invention will now be described in connection with the accompanying drawings forming part of this specification in which I have shown diagrammatically a preferred way in which my method may be carried out, after which I shall point out more particularly in the claims those features which I believe to be new and of my own invention.

In the drawings:

Figure 3 is an enlarged detail of the pick-up device.

Figure 4 is an end view with section of pipe or sheath.

Figure 5 is a side elevation of my assembled apparatus.

Figure 1:
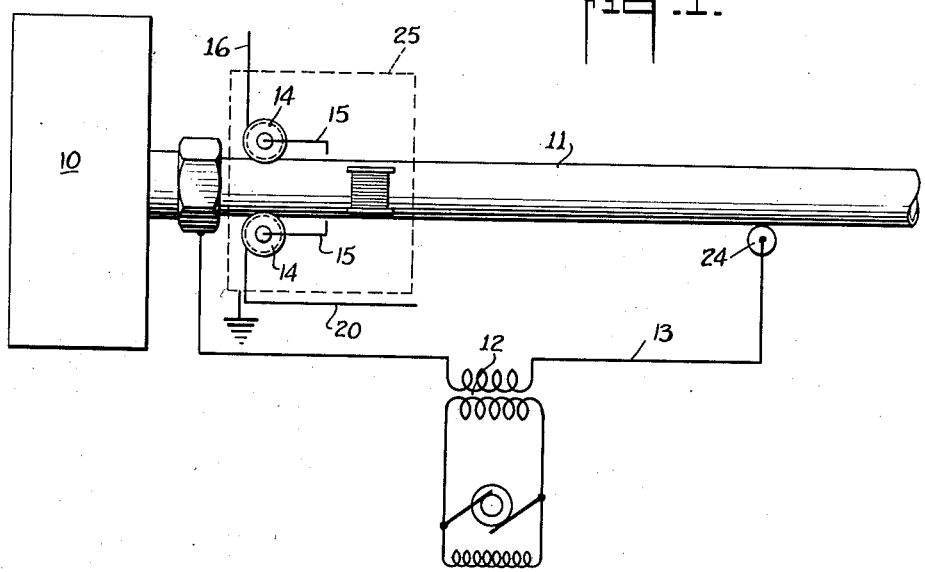
Figure 1 is a longitudinal diagram showing an extrusion press, the extruded pipe and the pick-up coils.

Referring to Figure 1, extrusion press 10 is diagrammatically indicated with its extruded pipe 11. Mounted around the pipe 11 I provide a pick-up device in which a plurality of coils 14 are disposed in pairs, each pair located on a diameter of the pipe and equidistant from the center thereof. This device is shielded electromagnetically and electrostatically by an iron pipe 25. The coils 14 are connected to responsive recording means as illustrated in Figure 2.

In carrying out my invention an electric current is passed through the pipe betwen spaced points and a circuit is shown through the extrusion press block 10, pipe 11, contact 24, cable 13, transformer 12, back to the block 10, the transformer using current preferably 100 to 1000 cycles, but any source of power suitable for the purpose may be utilized, the only object being to surround the pipe 11 with a fluctuating magnetic field.

It will be noted that the axis of the coils 14 is at right angles to the longitudinal axis of the pipe.

Figure 2:
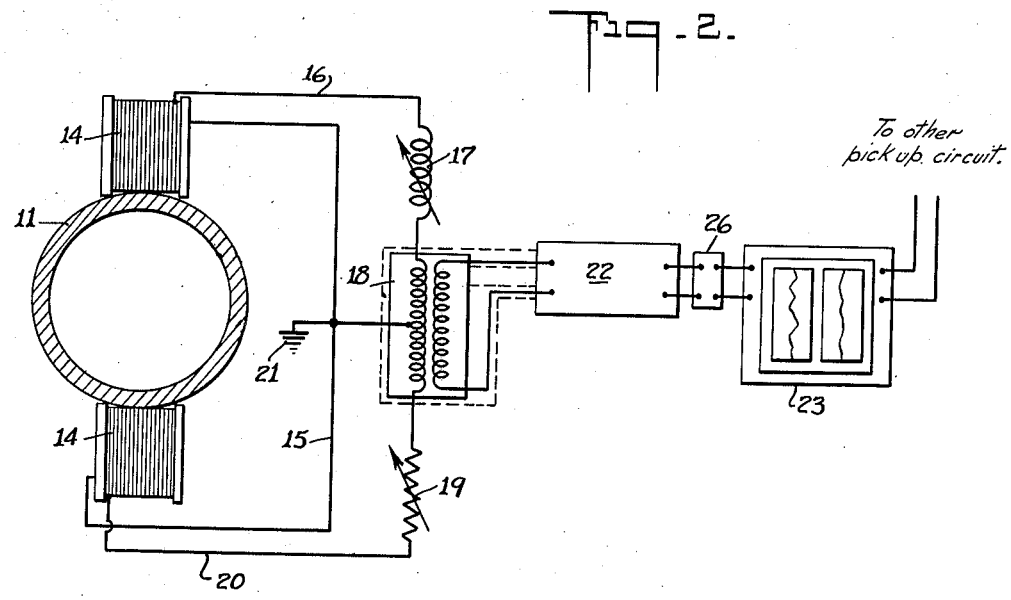
Figure 2 is a cross-section of the extruded pipe showing a pair of pick-up coils and electrical connections.

Referring more particularly to Figure 2, only two coils 14 of the pick-up device are shown with the necessary recording and measuring instruments. In practice this entire equipment is duplicated with each pair of pick-up coils used. In this diagram the pipe or sheath 11 is shown in section with the pick-up coils 14 set on the vertical diameter of the pipe, one on each side and equidistant from the center of the pipe. These coils 14 are connected together in opposition by the wire 15 and through the wire 16, variable inductor 17, the transformer 18, variable resistor 19 and the wire 20, completing the circuit.

The transformer 18 is preferably an amplifier input transformer in which the primary is connected at its mid-point to ground 21 and to the connecting wire 15 between the two coils. The secondary of the transformer is connected to a vacuum tube amplifier 22, which supplies sufficient power to operate a D. C. recording voltmeter 23, Figure 2, through the rectifier 26. This voltmeter is shown as a double instrument with one part connected to each of the two pairs of pick-up coils.

The variable inductor 17 and the variable resistor 19 are used to adjust the instruments to zero reading with perfect concentricity of the pipe or sheath.

While I have shown the ground 21 connected to the center of the primary of the amplifier input transformer 18, it may be desirable to connect this ground to the center of a potentiometer across the primary of the transformer 19.

Figure 3 shows the pick-up device for holding the coils 14. As illustrated this is designed for use with two pairs of coils, one pair at each end, for recording horizontal and vertical eccentricity respectively. Each pair of coils is held from slipping sideways by a pair of rollers 27 mounted on diameters of the cable set at right angles to the respective diameters of the coils. Both coils and rollers are held, pressed against the pipe by the main springs 28, and by the small springs 29. The main springs 28 act through linkages as shown, causing the coils and rollers to automatically adjust themselves to the diameter of the pipe, and overcoming any forces tending to throw the pick-up device out of line with the cable. The small springs 29 take up the play in bearings 30 which allow the individual coils or rollers to follow any small imperfections of the pipe. The sheet iron cover 25 acts as an electromagnetic and electrostatic shield around the coils to prevent the pick-up of external electrical disturbances.

In the preferred embodiment of a suitable coil carrier which I may employ I have shown a device for holding the coils in engagement with the pipe, as comprising two main plates 46 adapted to move to and from each other, each provided with two long bosses 41 and two short bosses 42 diametrically spaced. In the short bosses are securing bearing pins 43 which are pinned therein in fixed position by means of pins 44. In the long bosses 41 I provide holes, through which the pins 43 slide. The opposite ends of these pins from those attached to the moving plates 40 are secured to partition plates 45 by the screws 46 or other means. Four springs 28 operate one upon each of these pins 43 to normally urge the plates 40 to approach each other.

As said before in my preferred device I employ two pairs of coils 14 and they are held in position against the moving pipe 11 by the four rollers 27. Each roller and each coil, eight in all, are individually connected to both of the plates 40 in the same manner through a series of linkage as follows, only one such connection being explained:

The roller 27 is mounted to revolve in shaft 50 journaled in yoke 51 which is pivoted to one of the plates 40 at 52. The yoke 51 has a lever 53 extending substantially at right angles to the yoke, the end 54 being linked by pin 55 on the other plate 40.

Figure 5 shows the suspension of the pick-up device in relation to the extrusion press. The pipe 25 which encloses my pick-up device is provided with two suspension eyes 60 to which may be fastened any suitable spring 61, chain 62, suspension, from an over-head beam 63 or carrier. Adjustable means 64 are provided to anchor the device to the die block of the extrusion press to prevent the pick-up coil assembly from moving with the cable or sheath as it is leaded or extruded. This adjustable means 64 which I have shown for convenience in the form of an anchor chain 65, includes a turn buckle 66 for adjustment, is duplicated on each side of the cable in a horizontal plane.

This invention has its particular use in lead extrusion but it is also applicable to other metals and may be used for determining the eccentricity of any pipe and the invention is to be understood as having such scope.

I wish it distinctly understood that my eccentricity detector herein described and illustrated is in the form in which I desire to use it and that changes or variations may be made as may be convenient or desirable without departing from the salient features of my invention and I therefore intend the attached claims to cover such modifications as naturally fall within the lines of invention.

I claim:

1. An apparatus for detecting or recording eccentricity of lead pipe, comprising one or more pairs of electromagnetic pick-up coils disposed symmetrically with respect to the pipe, and connected in electrical opposition with external inductance and resistance whereby the induced currents of the opposing coils may be balanced in both phase and magnitude, a shield of magnetic metal enclosing the pick up coils, a supporting means for said shield comprising an elastic linkage so that the shield is free to move with the pipe in a plane normal to the direction of travel of the pipe, while being restrained from longitudinal movement, by inelastic but flexible linkages.

2. An apparatus for detecting and/or recording eccentricity of extruded pipe, comprising a pick up coil device enclosed within a shield of magnetic metal, through which the pipe passes, a supporting means for said shield comprising an elastic linkage restrained to swing in one plane, said pick up coils being mounted so that clearance between opposed coils is automatically adjustable to the pipe diameter and all coils being held in definite position with respect to the pipe axis by means of rollers linked to the said coils, whereby the shield is yieldingly supported to swing transversely with the cable while being restrained from longitudinal movement.

3. The device of claim 2 with the elastic linkage supporting the shield so that it is free to move with the pipe in a plane normal to the direction of travel of the pipe while being restrained from longitudinal movement by inelastic but flexible linkages.

4. The device of claim 1 with the addition of means for graphically recording eccentricity of the pipe on a chart driven synchronously with the flow of the pipe and recording eccentricity as proportional to the difference in voltages from the pair of pick up coils to which it is connected.

JOHN HUNTER PALMER.